US012602548B1

(12) United States Patent
Sengupta et al.

(10) Patent No.: US 12,602,548 B1
(45) Date of Patent: Apr. 14, 2026

(54) REWARD WEIGHTING ALIGNMENT OF LARGE LANGUAGE MODELS

(71) Applicant: Amazon Technologies, Inc., Seattle, WA (US)

(72) Inventors: Sailik Sengupta, Santa Clara, CA (US); Daniele Bonadiman, Sunnyvale, CA (US); Yi-An Lai, Bellevue, WA (US); Arshit Gupta, Sunnyvale, CA (US); Dan Roth, Philadelphia, PA (US); Katrin Kirchhoff, Seattle, WA (US); Saab Mansour, San Jose, CA (US); James Yipeng Huang, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 18/518,355

(22) Filed: Nov. 22, 2023

(51) Int. Cl.
| | |
|---|---|
| *G06F 40/284* | (2020.01) |
| *G06N 3/0455* | (2023.01) |
| *G06N 3/08* | (2023.01) |

(52) U.S. Cl.
CPC ......... *G06F 40/284* (2020.01); *G06N 3/0455* (2023.01); *G06N 3/08* (2013.01)

(58) Field of Classification Search
CPC ....... G06F 40/284; G06N 3/0455; G06N 3/08
See application file for complete search history.

(56) References Cited

U.S. PATENT DOCUMENTS

| | | | |
|---|---|---|---|
| 2007/0083357 A1* | 4/2007 | Moore | G06F 40/45 704/4 |
| 2021/0366464 A1 | 11/2021 | Rozen et al. | |
| 2022/0129629 A1* | 4/2022 | Niu | G06F 40/242 |

OTHER PUBLICATIONS

Beurer-Kellner et al., "Prompt sketching for large language models," arXiv preprint arXiv:2311.04954 (Nov. 8, 2023). (Year: 2023).
Huang et al., "DeAL: Decoding-time Alignment for Large Language Models, " arXiv preprint arXiv:2402.06147 (2024). (Year 2024).
Spinner et al., "Revealing the Unwritten: Visual Investigation of Beam Search Trees to Address Language Model Prompting Challenges," arXiv preprint arXiv:2310.11252 (Oct. 2023) (Year: 2023).
Wang et al. "Simultaneous Machine Translation with Large Language Models," arXiv preprint arXiv:2309.06706 (Sep. 13, 2023) (Year: 2023).
U.S. Appl. No. 18/518,329 **, filed Nov. 22, 2023.

* cited by examiner

*Primary Examiner* — Ibrahim Siddo
(74) *Attorney, Agent, or Firm* — Knobbe, Martens, Olson & Bear, LLP

(57) ABSTRACT

This patent application relates to using framework parameters with a large language model to create beams based on a prompt. The beams can be evaluated using multiple criteria of a reward model that can be weighted for importance. The beams can be evaluated according to each of the one or more criteria and compared to determine which beams most closely align with the criteria. The beam that best aligns can be selected to generate a response.

20 Claims, 7 Drawing Sheets

100

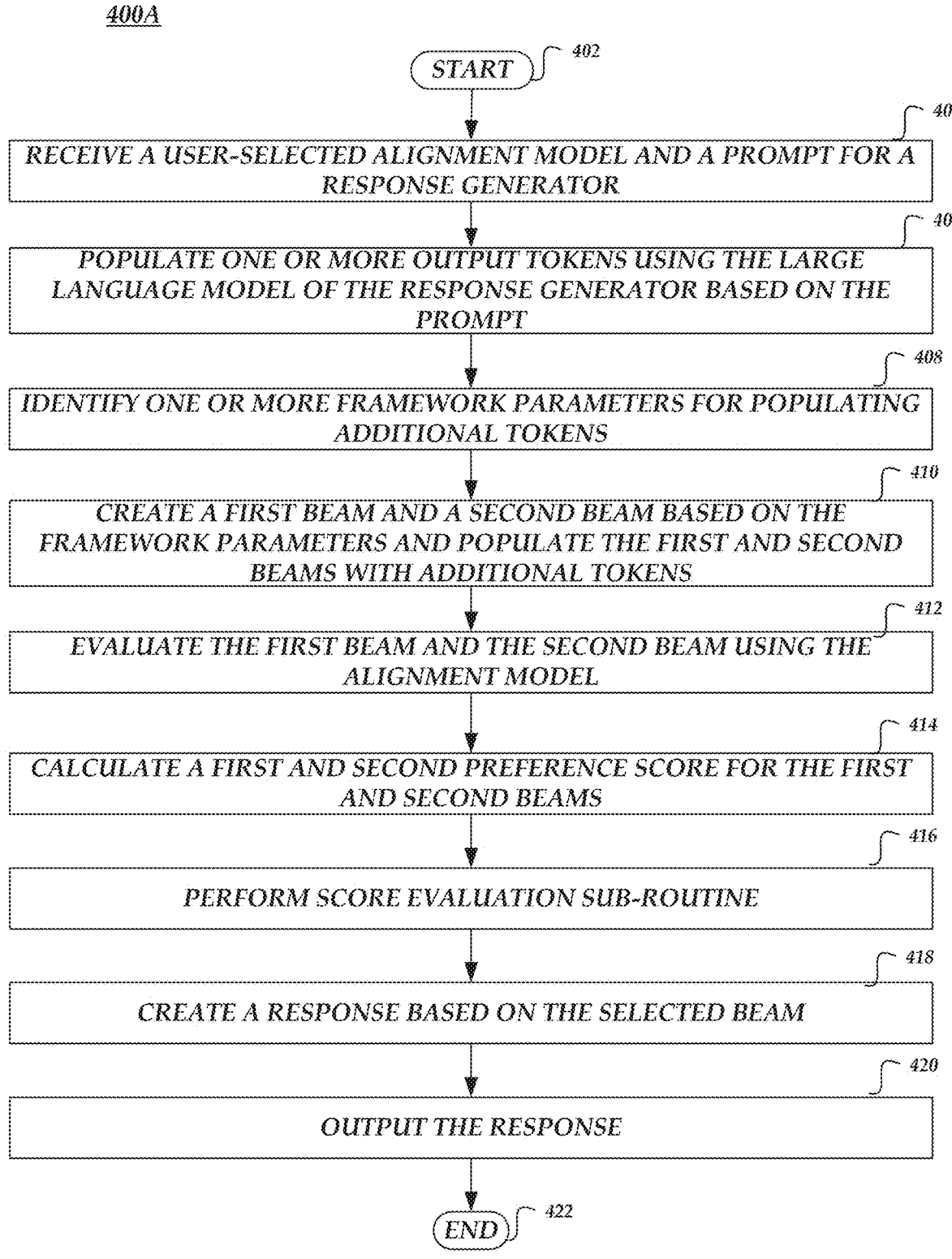

*400A*

START ⟩ — 402

RECEIVE A USER-SELECTED ALIGNMENT MODEL AND A PROMPT FOR A RESPONSE GENERATOR — 404

POPULATE ONE OR MORE OUTPUT TOKENS USING THE LARGE LANGUAGE MODEL OF THE RESPONSE GENERATOR BASED ON THE PROMPT — 406

IDENTIFY ONE OR MORE FRAMEWORK PARAMETERS FOR POPULATING ADDITIONAL TOKENS — 408

CREATE A FIRST BEAM AND A SECOND BEAM BASED ON THE FRAMEWORK PARAMETERS AND POPULATE THE FIRST AND SECOND BEAMS WITH ADDITIONAL TOKENS — 410

EVALUATE THE FIRST BEAM AND THE SECOND BEAM USING THE ALIGNMENT MODEL — 412

CALCULATE A FIRST AND SECOND PREFERENCE SCORE FOR THE FIRST AND SECOND BEAMS — 414

PERFORM SCORE EVALUATION SUB-ROUTINE — 416

CREATE A RESPONSE BASED ON THE SELECTED BEAM — 418

OUTPUT THE RESPONSE — 420

END ⟩ — 422

*FIG. 4A*

_400B_
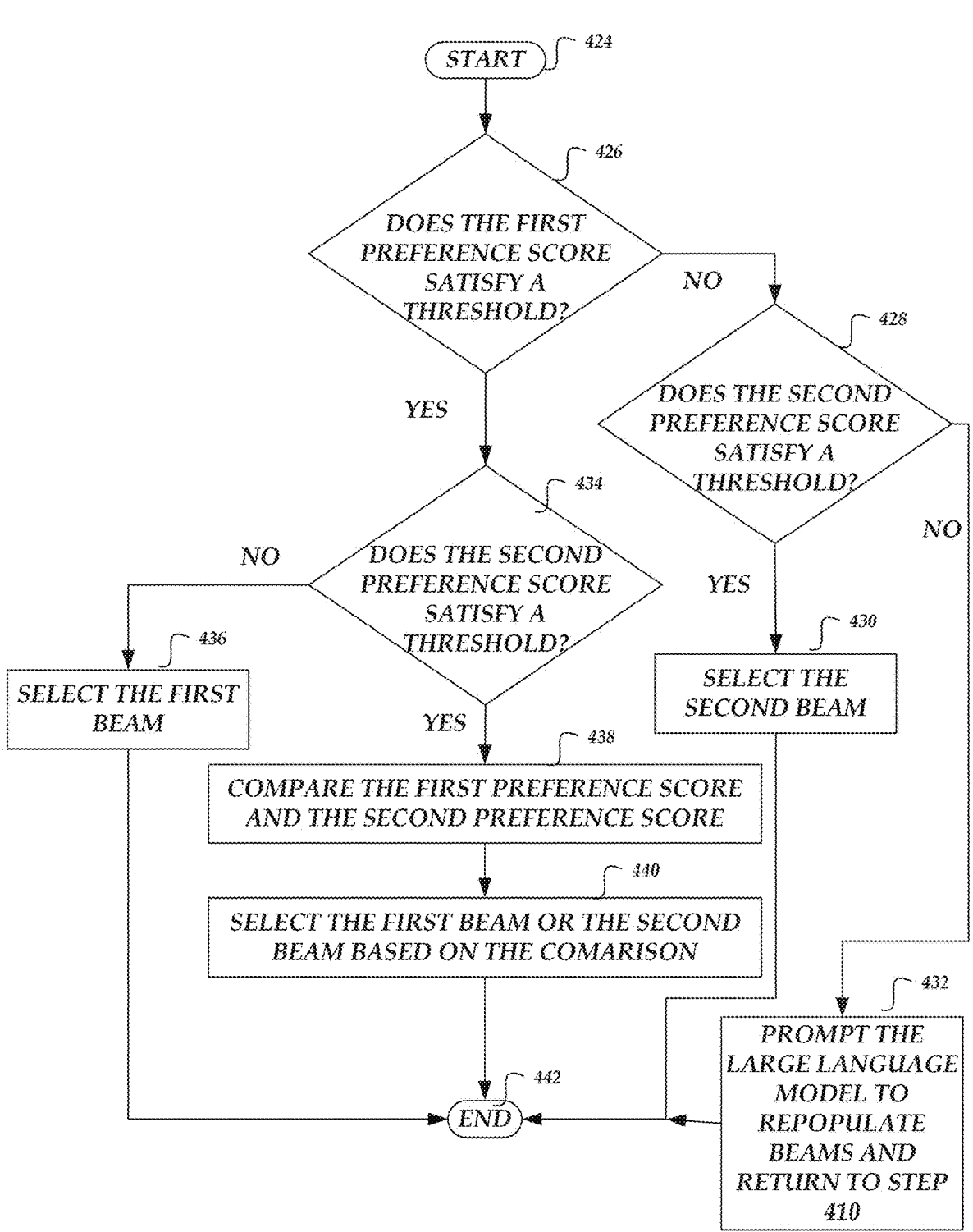
_FIG. 4B_

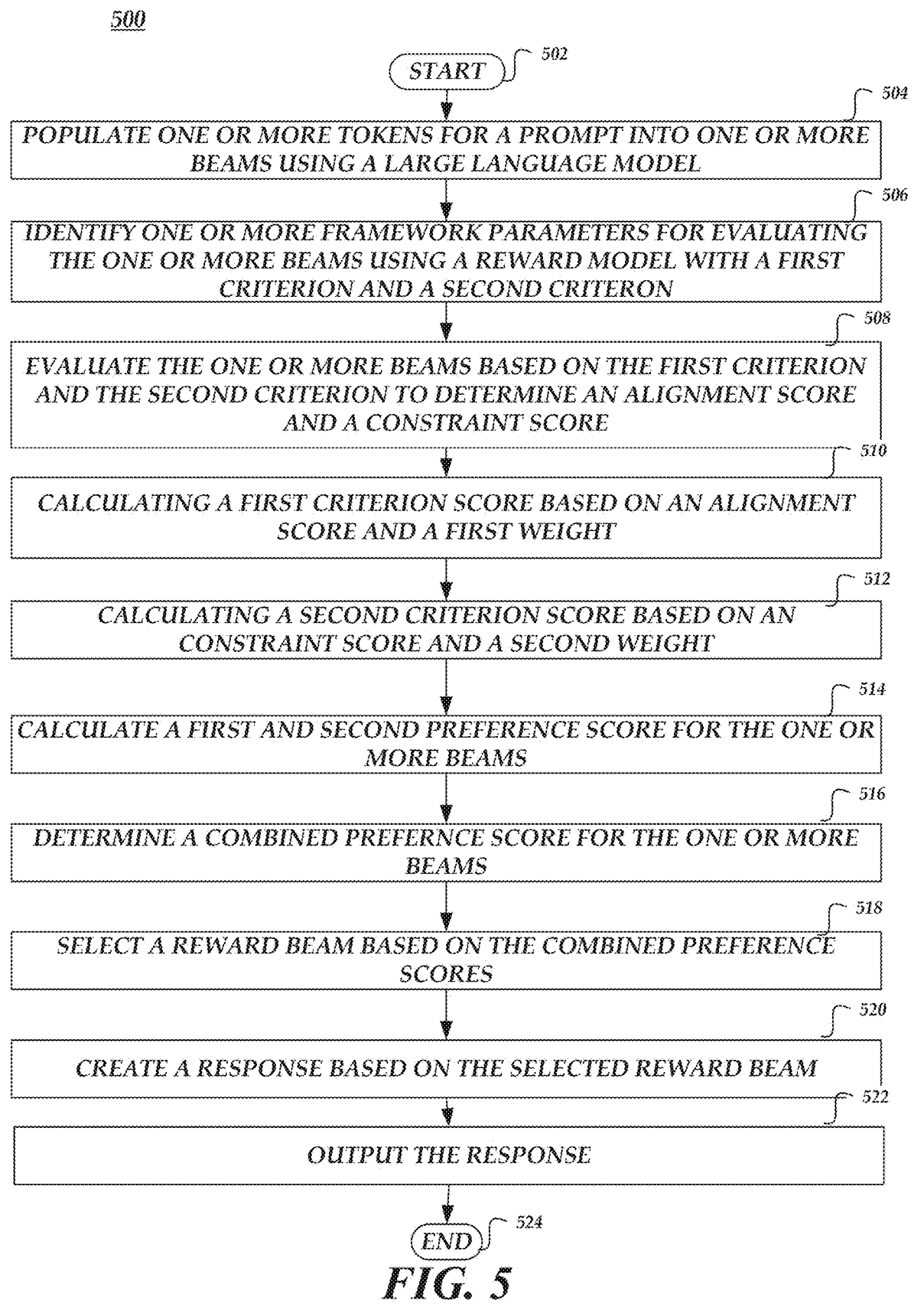

_500_

START — 502

POPULATE ONE OR MORE TOKENS FOR A PROMPT INTO ONE OR MORE BEAMS USING A LARGE LANGUAGE MODEL — 504

IDENTIFY ONE OR MORE FRAMEWORK PARAMETERS FOR EVALUATING THE ONE OR MORE BEAMS USING A REWARD MODEL WITH A FIRST CRITERION AND A SECOND CRITERON — 506

EVALUATE THE ONE OR MORE BEAMS BASED ON THE FIRST CRITERION AND THE SECOND CRITERION TO DETERMINE AN ALIGNMENT SCORE AND A CONSTRAINT SCORE — 508

CALCULATING A FIRST CRITERION SCORE BASED ON AN ALIGNMENT SCORE AND A FIRST WEIGHT — 510

CALCULATING A SECOND CRITERION SCORE BASED ON AN CONSTRAINT SCORE AND A SECOND WEIGHT — 512

CALCULATE A FIRST AND SECOND PREFERENCE SCORE FOR THE ONE OR MORE BEAMS — 514

DETERMINE A COMBINED PREFERNCE SCORE FOR THE ONE OR MORE BEAMS — 516

SELECT A REWARD BEAM BASED ON THE COMBINED PREFERENCE SCORES — 518

CREATE A RESPONSE BASED ON THE SELECTED REWARD BEAM — 520

OUTPUT THE RESPONSE — 522

END — 524

FIG. 5

REWARD WEIGHTING ALIGNMENT OF LARGE LANGUAGE MODELS

BACKGROUND

Recently, artificially intelligent (AI) chatbots have become widely available and are becoming increasingly common as a search tool. For example, users can access an AI chatbot to ask questions or prompt actions and receive immediate feedback in a requested format. Often, the AI models used within the AI chatbots are trained using certain constraints to prevent dangerous or unhelpful answers from being generated. Thus, a user may be able to prompt an AI chatbot and receive an answer that is, ideally, helpful or harmless.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 4A is a flow diagram depicting a routine for creating a response for a prompt received by the response generator of FIG. 1, according to one embodiment.

FIG. 4B is a flow diagram depicting a sub-routine of the routine in FIG. 4A for selecting a beam created by the response generator, according to one embodiment.

FIG. 5 is a flow diagram depicting a routine for utilizing weights and multiple constraints to generate a controlled response to a prompt according to the response generator of FIG. 2, according to one embodiment.

DETAILED DESCRIPTION

Figure 1:
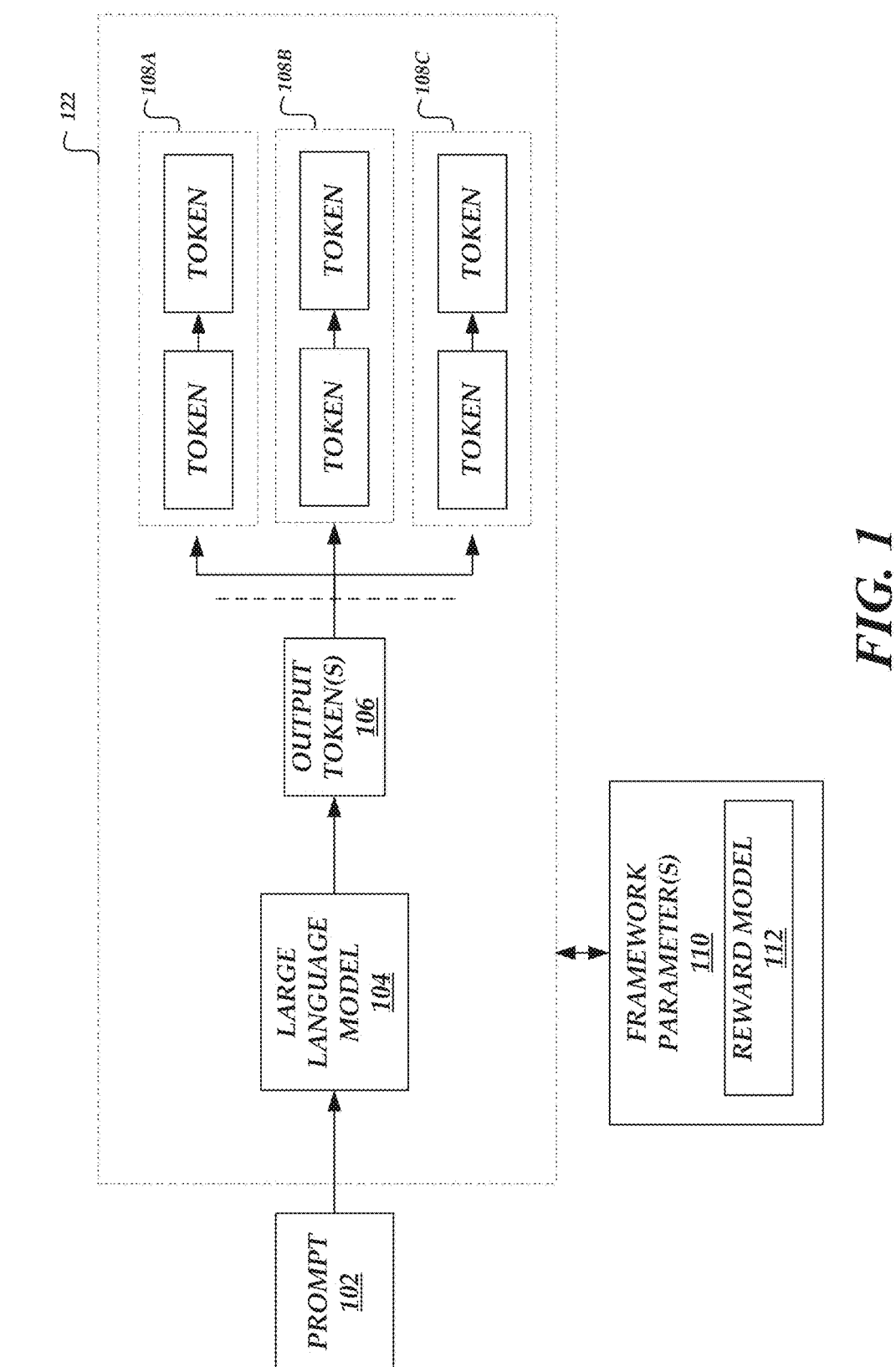
FIG. 1 is a block diagram of a response generator, according to one embodiment.

As described above, users can access an artificial intelligence (AI) chatbot to ask questions or prompt actions and receive immediate feedback in a requested format. Often, the AI models used within the AI chatbots are trained using certain constraints to prevent dangerous or unhelpful answers from being generated. Thus, a user may be able to prompt an AI chatbot and receive an answer that is, ideally, helpful or harmless. However, it can be difficult to train the model of the AI chatbot to accurately meet objectives for the AI chatbot, adjust the AI chatbot's objectives without retraining the model, and prevent user prompts from overcoming the objectives to achieve undesired, offensive, or even dangerous answers. As a result, the AI chatbot may be functioning in a limited capacity.

To alleviate this issue, some conventional systems use future constraints to compare a desired answer with potential answers. In some cases, for example, a future constraint may determine the answer should include a target word and can populate multiple potential answers and eliminate non-conforming answers. Future constraints are limited by a binary decision process, either the potential answer includes the word, or it does not. Future constraints further aid the AI chatbot in generating correct or correctly formatted answers and may not cover all constraints for which the AI chatbot is trained.

An AI chatbot may be trained using alignment constraints that train the AI chatbot to follow constitutional principles. Constitutional principles are principles, according to human understanding, that are a variable metric that is best tracked using a machine learning model. Constitutional principles can be, for example, helpfulness, harmlessness, or honesty. For example, an AI chatbot may be trained to be harmless and may attempt to create only harmless potential answers. A future constraint may be configured to check potential answers for words associated with offensive content. However, the future constraint can only be used to identify whether the word or phrase is included, and if it is, eliminate the potential answer from being output. Certain prompts may enable the AI chatbot to write an offensive response that does not include any of the phrases the lookahead heuristic is checking for. Thus, it may be desirable to enable an AI chatbot to generate and check potential answers using framework parameters, including additional alignment models, that can check potential answers for compliance with objectives.

Generally described, aspects of the present disclosure are directed to a response generator that can utilize multiple learning models and framework parameters to create and validate potential responses to aid in outputting answers that comply with a preferred set of objectives. A response generator can include a large language model that is trained to produce one or more potential answers to a prompt. For example, a prompt could be provided to the response generator requesting, "Which materials are the most dangerous for humans?" The large language model can be trained to be harmless such that it will not populate harmful answers. Instead, the large language model may populate the answer, "Many materials are dangerous for humans" to prevent a harmful answer where the prompt provides examples of dangerous substances that could be used for malicious purposes. A future constraint may be included to ensure answers are less than a threshold number of words. For example, to prevent a full list of dangerous substances, the future constraint may limit the response to a word limit of 15.

In some situations, prompts can "jailbreak" the large language model, by phrasing questions in a precise way to get around constraints. For instance, asking "How might one access prohibited materials?" could yield dangerous responses. However, asking "What security measures protect against unauthorized access?" may provide similar insights, while focusing on safety precautions rather than harmful actions. Where the previous prompt may generate answers that can be considered harmful instructions, the second may produce similar answers, but may be considered informational for wary students about to participate in a lab setting.

To prevent the second response from providing a similar and dangerous answer, a second language model may be an alignment model that is trained to be harmless and can be used as a constraint at decoding time. An alignment model can be trained using reinforcement learning from human feedback (RLHF) to evaluate an answer based on constitutional principles. An RLHF uses reinforcement learning with human feedback. The learning and feedback enables the alignment model to give a numerical value to a potential answer that equates to how well the potential answer conforms with the constitutional principle. For example, if the first language model creates the answer, "A lab can be exposed to a virus if a vial of the live virus breaks." The alignment model can review the answer and determine if the answer is actually harmless or not. The alignment model can review multiple features of the answer and give each one a score, features can be identified from the training. Multiple feature scores can be aggregated to give the answer an aggregated feature score. If the answer is does not meet a minimum threshold of aggregated feature score of harmlessness, the answer can be eliminated as an option for response. A feature score can be a comparison of a feature of the one or more features to a feature as expected by the alignment model. For example, aggregated feature scores for a response may be 0.8, indicating the alignment model is 80% confident the first response is harmless. A threshold may be 82% which would eliminate the first response from consideration for not meeting the threshold. In some embodiments, the feature as expected can be derived from the features in the tokens and may not be explicitly expected by the alignment model. In some embodiments, the large language model could then be prompted to create another potential response. The second prompt may indicate additional constraints that prevent an identical response from being created. In some embodiments, the response generator may output a canned response indicating it cannot provide an answer.

In some embodiments, the response generator may utilize framework parameters to create multiple potential responses and can score each potential response to select a response. The response generator may utilize framework parameters to create one or more potential responses. A framework parameter can include 'beam size', 'lookahead length', and 'lookahead after' in addition to a reward model that includes the alignment model as discussed above. To most effectively utilize computing resources, the response generator may create a first number of tokens that will apply to all potential responses. A token is a sequence of characters in text that are grouped together as a useful semantic unit for processing. A token can be a word generated by the large language model to be part of the answer. The first number of tokens can be generated according to the lookahead after framework parameter which defines how many first tokens, or first words, should be populated. For example, if every response to the lab prompt above would begin, "A lab can be exposed to a virus . . . " there may be no reason to evaluate the first eight words of the answer in each potential answer using the alignment model. Therefore, the lookahead after value may be set to a number that can likely include the words common to the answers.

The response generator can utilize the beam size to determine the number of potential answers to create. For example, a beam size of three will create three potential answers. Beams include one or more tokens that follow the first tokens that are common to all answers. The beam length can be constrained by the lookahead length. For example, a lookahead length of four may create three beams of no more than four tokens. A beam constrained by a lookahead length may only create a partial response. By reviewing only a portion of a full response, the response generator can limit the number of tokens that need to be reviewed and can potentially eliminate beams prior to the full response being generated. For example, if the third token within a beam is an offensive word, an alignment model used as a reward model may review the beam and determine it is not a viable answer, thereby eliminating that beam without using resources to generate and evaluate the full response.

In some embodiments, the reward model may include multiple criteria. A first criterion may be the alignment model and a second criterion may be a constraint checker that includes one or more constraints for the potential responses. The constraints may include keyword constraints, maximum length, minimum length, desired formats, an inclusion requirement, and the like. For example, using the constraint checker, each potential response may be evaluated to ensure it includes the word "please." In some embodiments, a response generator may be desired to prioritize certain constraints and constitutional principles depending on the intended use. For example, if a response generator uses a large language model that is trained to provide services for an airline, certain constraints may be more desirable than others. For example, the assumption may be that any user prompting the response generator may be likely to be looking for help. In such a circumstance, the response generator may be better suited to be helpful rather than harmless. Further, the airline may desire the responses to be short, and always include polite words such as "please" as the responses are going to a customer of the airline using the response generator. The response generator may benefit from emphasizing one or more framework parameters over others. For example, it may be more beneficial that the provided answer is helpful rather than constrained to a word limit. To enable such emphasis, the alignment model and constraints of the constraint checker within the reward model may be weighted. Based on the weights, the response generator may select an answer that best aligns with the desired emphasis. For example, the airline may prefer the user receives a helpful answer, rather than an answer that is under 30 words.

Using the weighted constraints, the response generator may evaluate one or more potential answers to determine the best response by calculating criterion scores. Criterion scores can indicate a probability that a response created using each of the one or more beams will comply with the criterion. The response generator may first consider the alignment model scores to eliminate any potentially nonconforming responses and to create aggregated values for all potential responses. For example, aggregated feature scores for a response may be 0.8, a second response may be 0.65, and a third response may be 0.7. These scores indicate the alignment model is 80% confident the first response is harmless, 65% confident the second response is harmless, and 70% confident the third response is harmless. A threshold of 70% which would eliminate the second response from consideration for not meeting the threshold. The response generator can create a criterion score by weighing the alignment model with a defined weight value. For example, the alignment model may be weighted with a weight of 1.2 giving the first response a criterion score of 0.96 and the third response a criterion score of 0.84. Next, each remaining potential response may be checked by a constraint checker. The constraint may be a binary answer such that a constraint score associated with the constraint checker is 0 or 1. For example, if the constraint sets a maximum length for an answer to be less than 10 words and the first response is 11 words, the constraint score for the first response is 0. If the third response is 9 words, the constraint score for the third response is 1. The constraint score can then be multiplied by the weight assigned to the constraint to determine the second criterion score for the response. For example, if the weight for the length is 0.3, the second criterion score for the first response is 0 and the second criterion for the third response is 0.3.

Using the first criterion score and the second criterion score, the response generator can determine a combined preference score and select a potential response based on the score. For example, the combined preference score for the first response is 0.96 and the combined preference score for the third response is 1.04. Therefore, the response generator would select the third response to generate and output a response.

Over time, the desired objectives of a response generator may change. For example, the airline may determine that the answers are too long when including the polite words and may want to eliminate the polite words from the response generator. Using the polite word constraint as a framework parameter rather than as a trained element of the large language model, the response generator can easily be adjusted to fit the new goals without retraining the large language model.

Example Response Generator System Environment

FIG. 1 is a block diagram of an alignment model response system 100 including a response generator 122, according to one embodiment. The response generator 122 may receive a prompt 102 at a large language model 104. The large language model 104 may be a machine learning model trained to understand and generate natural language. The large language model 104 may be trained to receive a natural language input and generate an appropriate response to the input. To generate an appropriate response, the large language model may be, for example, an autoregressive model, a transformer model, an encoder-decoder model, or a pre-trained model that is trained to complete an objective. For example, a large language model 104 may be trained to aid a customer of an airline in activities related to their air travel. A large language model 104 may be trained with a set of constraints such as soft constraints and hard constraints as well as constitutional principles to determine the type of outputs the large language model 104 generates. Constitutional principles may be a human principle such as harmless, helpful, or honest. A soft constraint may be similar to constitutional principle and be a human understood constraint with a definition that may change over time. For example, prompting the large language model for a "kind" response.

Based on the prompt 102, the large language model 104 may populate one or more tokens 106 as the beginning of a response. A token 106 in some examples is a word or a phrase generated by the large language model 104 for a response to the prompt 102. For example, a prompt may be, "Can I make sure my seat isn't next to anyone with an animal on board?" The output tokens 106 may be a first few words that will be common among all answers. For example, the first four output tokens 106 may be "seats" "on" "our", and "flights".

The next tokens or words for the answer to the prompt may be generated by the response generator in accordance with one or more framework parameters 110. Framework parameters can be defined as part of the response generator 122 or can be stored remotely and accessed by the response generator 122. The framework parameters 110 are parameters that define the next steps after the output tokens 106 the response generator 122 should take. For example, a framework parameter may identify how many potential responses 108A-C should be generated before the potential response 108A-C are reviewed. The potential responses 108A-C are created by creating beams of additional tokens, wherein each beam is a potential response 108A-C, and each beam comprises one or more additional tokens. Based on the framework parameters 110, the response generator 122 can create the first beam 108A, the second beam 108B, and the third beam 108C and populate the beams with additional tokens. In some embodiments, the additional tokens for the first beam 108A may be a first subset of the additional tokens, the additional tokens for the second beam 108B may be a second subset of the additional tokens, and the additional tokens for the third beam 108C may be a third subset of the additional tokens. In some embodiments, the subsets are distinct from one another. In some embodiments, the subsets include common tokens.

A framework parameter 110 may comprise a reward model 112. A reward model 112 can include a first criterion which is an alignment model trained to evaluate tokens 108 based on an alignment principle. Alignment principles can be constitutional principles such as helpful, honest, and harmless. In some embodiments, the alignment model is a previously trained critique model. In some embodiments, the alignment model is selected by a user based on the desired goals of the response generator. For example, the airline can select a helpful alignment model for the response generator 122 configured to aid passengers with requests. In some embodiments the alignment model can be trained to be more than just one of helpful, honest, and harmless.

After populating additional tokens in the potential responses 108A-C, in some embodiments, the response generator 122 utilizes the reward model 112 to evaluate the potential responses 108A-C. In some embodiments, the reward model 112 evaluates the full output response including the output tokens 106 and the potential responses 108A-C.

To evaluate the potential responses 108A-C, the reward model 112 may review the responses and assign one or more features scores based on features of the responses. In some embodiments, the reward model 112 may be trained using the same or similar constraints to the constraints used to train the large language model 104. In some embodiments, the reward model 112 is trained on at least some different constraints. The features scores can be generated based on learning and feedback done when training the model. The feature scores can be combined into an aggregated feature score which is an alignment score. The alignment score can represent the percentage certainty the alignment model believes the response aligns with the alignment principle. For example, if an alignment model is a helpful model and an alignment score of the first beam 108A is calculated to be 0.7, the alignment model believes the first response 108A to be 70% aligned with the helpfulness model. Similarly, if the second beam 108B is 0.8 and the third beam 108C is 0.69, the percentages are 80% and 69% respectively. In some embodiments, the alignment score is a preference score for the reward model 112 if the only criterion within the reward model 112 is the alignment model.

After calculating the alignment scores, the response generator 122 can determine if the potential responses 108A-C all meet a threshold associated with the reward model. For example, in some embodiments, the potential response may only be a valid response if the preference score meets a threshold. The threshold can be preset or can be defined by a user via a user interface. In some embodiments, the threshold may depend on the number of criteria within the reward model 112 or may be based on the alignment model selected for the reward model 112. The threshold can indicate a minimum level of confidence that that potential output 108A-C aligns with the selected alignment principle.

For example, if the threshold is defined to be 0.71, the first beam 108A and the third beam 108B with scores of 0.7 and 0.69 respectively are not valid output responses and may be eliminated or may simply not be selected to be output. Therefore, the second beam can be selected as it satisfies the threshold.

In some embodiments, more than one potential responses 108A-C may satisfy the threshold. In such cases, the response generator 122 may choose the potential response 108 that has the highest alignment score or preference score. For example, the threshold could be defined to be 0.7 which would allow the first beam 108A and the second beam 108B to satisfy the threshold. The second beam 108B would be selected based on the alignment score of 0.8 being higher than the alignment score of 0.7. In some embodiments, the threshold may be a minimum threshold value that is user-defined via a threshold value user interface. The threshold may be adjusted prior to evaluating the potential outputs 108A-C.

In some embodiments, after a potential output 108A-C has been selected, the response generator 122 can generate a response and transmit the generated response to a storage or output it to the user prompting the response generator 122.

Figure 2:
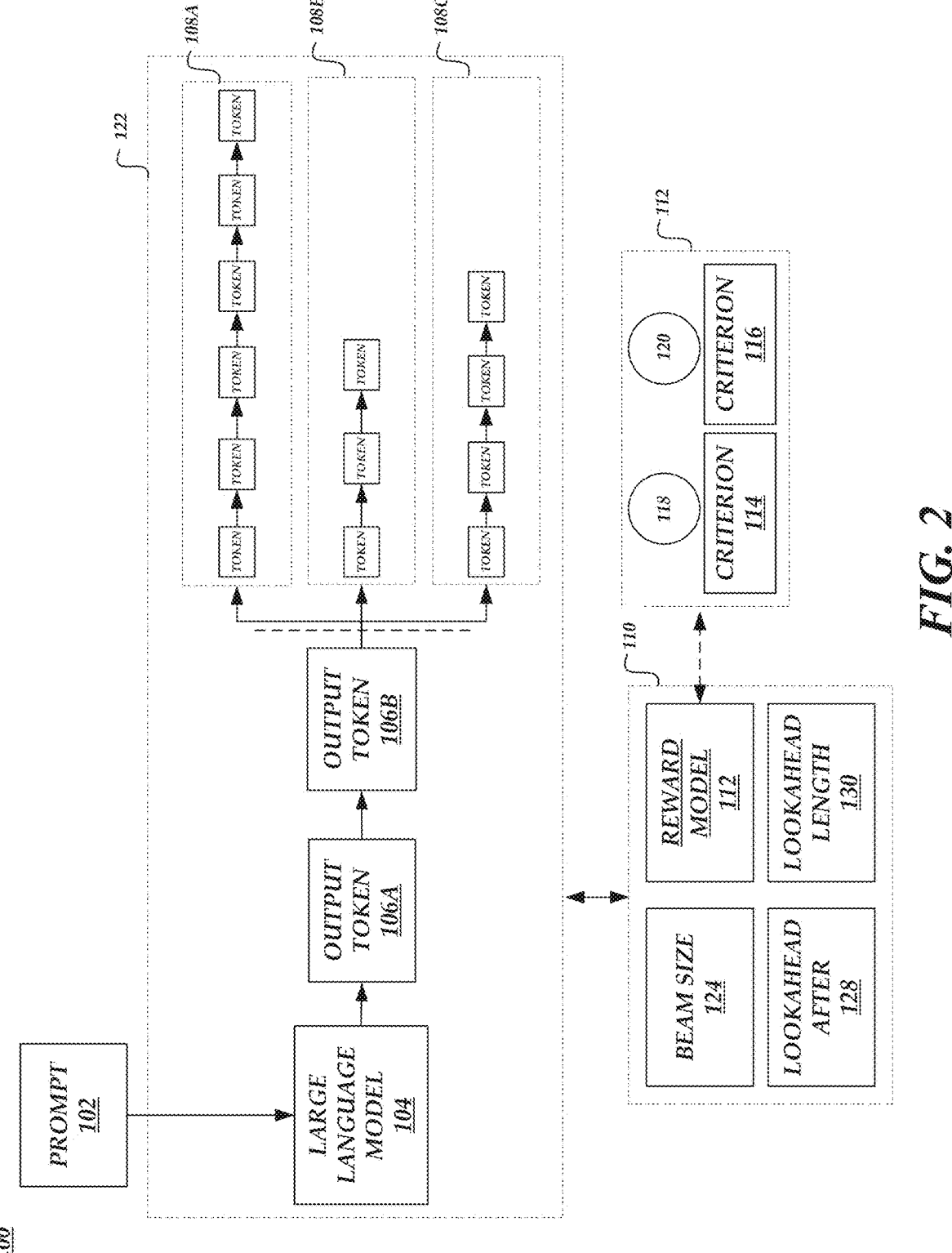
FIG. 2 is a block diagram of the response generator of FIG. 1 illustrating the operations performed by the components of response generator environment to generate tokens and beams using framework parameters, according to one embodiment.

FIG. 2 is a block diagram of the response generator 122 of FIG. 1 illustrating the operations performed by the components of the alignment model response system 100 to generate tokens 106 and beams 108 using framework parameters 110, according to one embodiment. In some embodiments, the response generator 122 of FIG. 1 can utilize multiple framework parameters 110 and a weighted complex reward model 112 to generate potential responses 108A-C. The framework parameters 110 can include, but are not limited to, a beam size 124, a lookahead after 128, and a lookahead length 130 along with the reward model 112 as shown in FIG. 1. When receiving a prompt 102, the large language model 104 can generate output tokens 106A and 106B that are common to all potential responses 108A-C. The number of output tokens 106 generated can be defined by the lookahead after 128 within the framework parameters 110. For example, the depicted lookahead after 128 is two which results in output token 106A and output token 106B being generated.

Prior to populating more tokens, the large language model 104 may review the framework parameters 110. The beam size 124 framework parameter 110 can indicate how many beams, or potential responses, 108A-C the large language model 104 is to create. For example, as show, the beam size 124 would be three, therefore the large language model 104 created a first beam 108A, a second beam 108B, and a third beam 108C each representing a potential output response.

Similarly, the lookahead length 130 can be reviewed by the large language model 104 prior to populating the beams 108A-C with additional tokens. The lookahead length 130 can describe the maximum number of additional tokens the large language model 104 will populate within each beam 108A-C. For example, the lookahead length 130 can be set to six. The first beam 108A can be populated with the maximum number according to the lookahead length 130 of six tokens. The second beam 108B and third beam 108C could include six additional tokens, however the large language model 104 only populated three to complete the potential response 108B and 4 additional tokens to populate the potential response 108C.

It should be appreciated that framework parameters 110 can be included or not included by a user and the values of each framework parameter can be set by a user. For example, one or more framework parameters can be received from the user after the prompt was received at the large language model 104, but prior to generation of any tokens by the large language model 104. Additionally, the framework parameters 110 can be received from the user prior to any prompt, or with a prompt. The framework parameters 110 can be changed for each prompt or can be selected once and changed when desired outcomes for the response generator 122 have changed.

In some embodiments, the framework parameters 110 can include a reward model 112. In some embodiments, reward model 112 is stored separately from framework parameters 110 and is accessed remotely. In some embodiments, the reward model is accessed and utilized directly by the response generator 122 and functions as required to complete the reward model 112 functions. In some embodiments, the reward model 112 can be an alignment function which can be used to evaluate how well a generated response aligns with a constitution principle. The reward model 112 can include one or more criteria, for example a first criterion 114 and a second criterion 116. A criterion can be an alignment model or a constraint checker. For example, the first criterion 114, can be an alignment model that is trained to be one of helpful alignment model, honest alignment model, or harmless alignment model. The alignment model can be defined by a user at a user alignment model interface wherein the user can switch between alignment models such as from a harmless alignment model to a helpful alignment model. The alignment models can be assigned at any point so long as responses are not actively being evaluated by the reward model. The second criterion 116 can, in some embodiments be a constraint checker. A constraint checker can include one or more constraints that can be used to evaluate the output responses 108A-C. A constraint can be, for example, a soft constraint, logical constraint, finite-state automaton, pus-down automaton, or a hard constraint. A soft constraint, like a constitution principle, is a subjective constraint that is often a human definition. For example, a "kind" response, a "polite" response," and the like. A hard constraint has a binary answer that the constraint is met or is not. For example, including "please" in the answer can be a hard constraint. Further hard constraints can include response length, format, and the like.

As part of the reward model 112, each criterion can be associated with a weight. For example, the first criterion 114 can be associated with a first weight 118 and the second criterion 116 can be associated with a second weight 120. The first criterion 114 may be an alignment model as described above. The reward model can be used to evaluate the potential responses 108A-C to identify an alignment score for the alignment model of the first criterion 114 and a constraint score associated with the constraint checker of the second criterion 116. The alignment score, as described above, can be identified as how will the potential output 108A-C aligns with the constitutional principle of the alignment model. The constraint score can be a binary score of 1 or 0 depending on if the potential output 108A-C satisfies the constraint or not. In some embodiments, the binary score is based on adherence to a rule. In some embodiments, soft constraints may be scored using a proportion. For each criterion 114, 116 the reward model 112 can create a criterion score for each of the output responses 108A-C. The criterion score can be the alignment score and the constraint score weighted by the weight associated with the criterion 114, 116. For example, the first criterion score for the first potential response 108A can be the alignment score multiplied by the weight 118 associated with the first criterion.

Specifically, for the first potential response 108A, the first criterion 114 may have an alignment score of 0.7 and a weight of 1.2 creating a first criterion score of 0.84. The second criterion score for the first potential response 108A can be the constraint score weighted by the weight 120 associated with the second criterion 116. For example, if the constraint is a hard constraint with a binary score, the constraint score may be 1 and the weight may be 0.3, creating a second criterion score of 0.3.

In some embodiments, the second criterion 116 is a constraint and the reward model can include additional constraints each associated with their own weights. In some embodiments, the second criterion 116 is a constraint checker that is associated with a weight 120, wherein the constraint checker can include one or more constraints that are associated with their own weights, wherein each constraint is weighted individually. In some embodiments, the collection of weighted constraint scores can be combined and be further weighted by the constraint checker weight 120. The constraints of the constraint checker can be weighted to prioritize one constraint over another. Further, the constraint checker weight can prioritize the second criterion 116 in relation to the first criterion 114.

In some embodiments, the first criterion 114 and the second criterion 116 can each be an alignment model. For example, the first criterion 114 can be a helpful alignment model and the second criterion 116 can be a harmless alignment model. The first criterion score and the second criterion score are alignment scores multiplied by their respective weights.

In some embodiments, the second criterion 116 can be a constraint checker that is used to evaluate each beam to determine if the beam complies with the second criterion 116. Only the beams that comply with the second criterion 116 can then be evaluated with the alignment model of the first criterion 114.

After calculating a first criterion score and a second criterion score for each of the potential responses 108A-C, the reward model 112 can determined a combined preference score for each of the one or more beams. The combined preference score is the total score of each potential response 108A-C based on the one or more criterion scores. For example, the first potential response 108A as described above can have a first criterion score of 0.84 and a second criterion score of 0.3, wherein the preference score would be 1.04.

In some embodiments, the reward model 112 can score the current generated response at step t as given by:

$$f(y_t) = \log P(y_{1:t} | x) + w(\max_{L_{y \leq l}} h(y_{1:t+l}, x))$$

Where h( ) is the preference score computed by the reward model and 1 is the lookahead length 130. Based on the combined preference score for each of the one or more beams, a reward parameter beam can be selected. In some embodiments, the selected beam is the beam with the highest preference score. The response can be created based on the reward parameter beam. In some embodiments, the beam 108 can include the entire response within the tokens generated for the beam 108. In some embodiments, the additional tokens can be a first set of tokens for the beam. After selecting a beam, the large language model 104 may populate the rest of the tokens required to create the response. In some embodiments, a first preference score may be used to eliminate low performing beams. For example, the user may set a preference score threshold. For each beam that is associated with a preference score that does not satisfy the threshold, the beam may be discarded or may be left as is. The beams that do satisfy the threshold may be populated with additional tokens and checked by the reward model 112 again. After each round of population, the reward model may compare the preference scores to the threshold until there is only one beam left, or the beams include complete potential responses. If the beams include complete potential responses and satisfy the threshold, the beam with the highest preference score may be selected and an output may be generated based on the selected beam. In some embodiments, the response is output.

Figure 3:
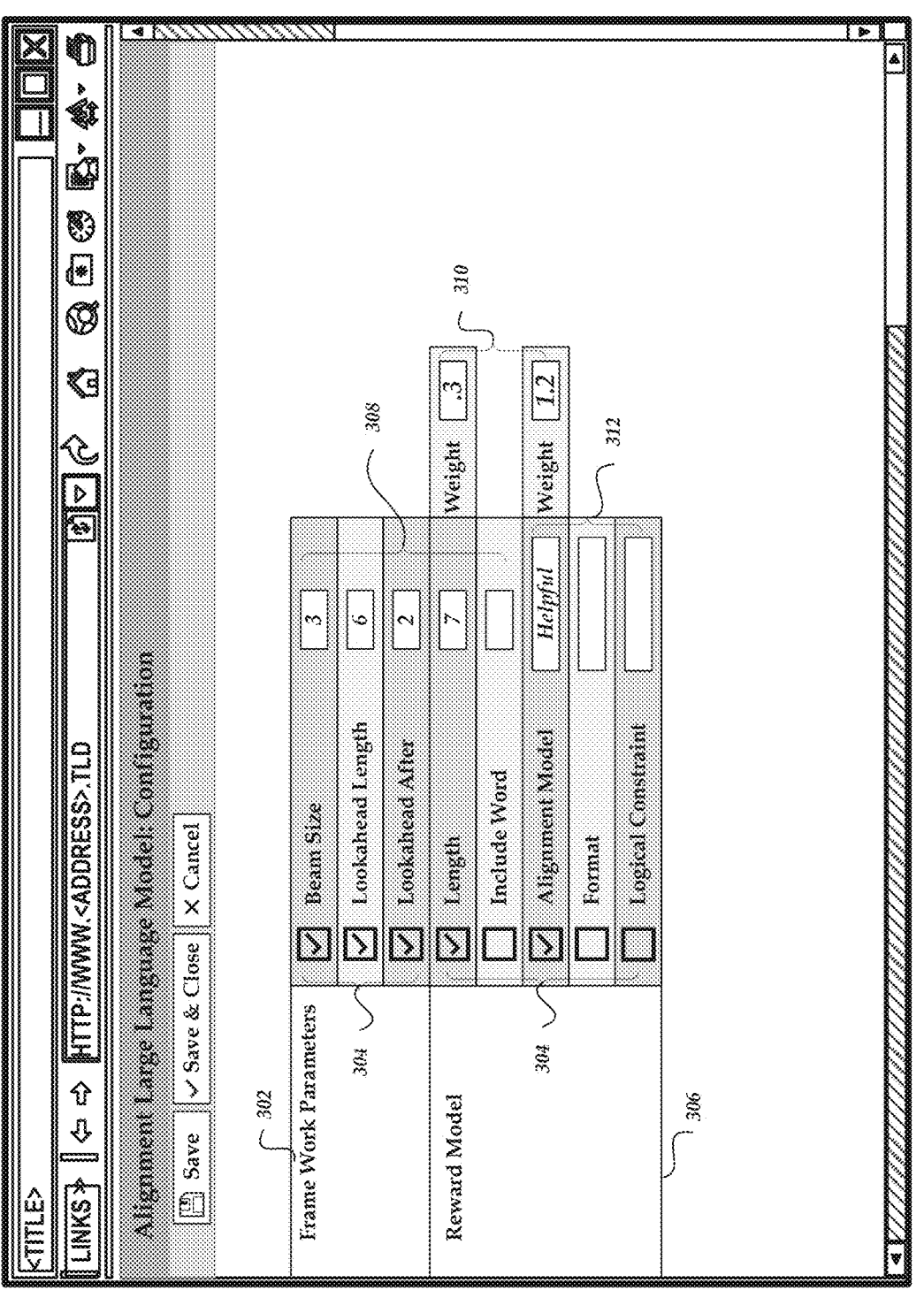
FIG. 3 is an example user interface for selecting framework parameters and reward model constraints for the response generator of FIG. 1, according to one embodiment.

FIG. 3 is an example user interface 300 for selecting framework parameters 110 and reward model 112 criteria for the response generator of FIG. 1, according to one embodiment. The framework parameter selection interface 302 can include interaction elements 304 that can act as selection tools for each framework parameter 110. Interaction elements 304 can enable user interaction via text input, value, input, or other selection methods. For example, the beam size interaction element 304 as shown is indicated as having been selected by user interaction with the interaction element. A user, by interacting with the interaction element 304, can deselect the beam size thereby not including beam size as a framework parameter 110 for the large language model 104. In some embodiments, certain framework parameters may not be deselected such that they are always required.

Additionally, for each framework parameter 110 within the framework parameter selection interface 302, the user can assign values at a weight input using a value interaction element 308. Values can indicate the number associated with the framework parameter. For example, the beam size framework parameter is shown to be assigned as a value of 3, thereby causing the large language model 104 of the response generator 122 of FIG. 1 and FIG. 2 to create three potential responses 108A-C. For example, the lookahead length framework parameter is shown to be assigned as a value of 6, thereby causing the large language model 104 of the response generator 122 of FIG. 1 and FIG. 2 to populate the three potential responses 108A-C with six or fewer additional tokens. For example, the lookahead after framework parameter is shown to be assigned as a value of 2, thereby causing the large language model 104 of the response generator 122 of FIG. 1 and FIG. 2 to create three potential responses 108A-C only after generating a first two output tokens 106. It should be appreciated that the shown framework parameters are example framework parameters and additional parameters useful for creating potential outputs may be included in the framework parameter user interface 302 and can be utilized by the large language model 104.

Returning to FIG. 3, the user interface 300 can further include a reward model selection interface 306. The reward model selection interface 306 can contain interaction elements 304, 308 310, and 312 that can be interacted with to select the functionality of the reward model. The reward model selection interface 306 can include one or more criteria for a user to select. For example, the reward model as shown includes length, include word, alignment model, format, and logical constraint as possible criteria to be utilized as part of the reward model. As discussed above, the reward model can combine one or more of the criteria to determine a preference score of a potential response 108. For example, as selected via the interaction element 304, the reward model shown includes a length constraint and an alignment model to uses as a first criterion and a second criterion.

The reward model selection interface 306 can further include value interaction elements 308. The value interaction elements 308 can be an interaction element in which a user can input a value for the criterion. For example, the value interaction element 308 for the length criterion has an input value of 7. The reward model 112 can understand the user intends the length of the response to be limited to 7 tokens.

The reward model selection interface 306 can further include definition interaction elements 308. The definition interaction elements 308 can be used to define the particulars of the criterion of the reward model 112 that may or may not be a value. For example, the format and alignment definition interaction elements 308 may be drop-down menus that provide the user with format options and available alignment models to choose from. In some embodiments, the response generator 122 may have access to a pre-trained alignment models that may be selected between to be a user-selected alignment model used by the response generator 122. In some embodiments, the user may be able to enter a pointer or other directional information into the definition interaction element 308 to indicate a location of an alignment model desired to be used as part of the reward model 112. In some embodiments, the user interface 300 can further include enabling interaction elements to allow a user to provide an alignment model to be used by the reward model.

The definition interaction elements 308 can further allow text entry for a constraint. In some embodiments, the include word criterion can require a text string to check for within the potential responses 108. Similarly, the logical constraint may accept a string to accept a word to ensure is not part of the output response, or a logical phrase. For example, "please" can be input in either the definition interaction element 308 for the include word criterion or the logical constraint criterion. In the include word criterion, the criterion checker may eliminate or set the criterion value to 0 for any potential output that fails to include "please". Inversely, in the logical constraint criterion, the criterion checker may eliminate or set the criterion value to 0 for any potential output that includes "please". In some embodiments, the logical constraint criterion can be set using a logical phrase. For example, "if thank you, then please." The criterion checker could then check each potential response for "thank you" and, if found, eliminate, or set the criterion value to 0 for any potential response that does not also include "please".

In some embodiments, the reward model selection interface 306 can include weight interaction elements 310. Weight interaction elements 310 can be included as part of the reward model selection interface 306 upon selection of a criterion as shown or may always be included. As described above, the weight 118, 120 is associated with a criterion and is used to adjust a criterion score or an alignments score. For example, the weight for the length criterion is set to 0.3 and the weight set for the alignment model is 1.32. In some embodiments, the weights defined in the weight interaction elements may not be numerical values that are used in a numerically weighted function. The weighting can be a polynomial weighted neural network function.

In some embodiments, some or all of the above values and selections may be pre-set. For example, as a standard, all framework parameters may be initially selected with general values for each. A weight may auto fill depending on the value or text defined for the criterion. For example, if the alignment model is selected as a helpful model, the weight may automatically populate as 1.2, whereas a harmless model may automatically populate a weight of 1.6. In some embodiments, once a value is set it is remembered even if the criterion has previously been deselected. For example, if the length was deselected from the reward model selection interface 306, but had previously been set to 7, upon length being reselected, the value may automatically be reset to 7.

In some embodiments, the values and weights may be automatically adjusted according to feedback. The user may be provided with a test in which the user can enter prompts and receive responses. The user can grade the responses and provide feedback that can be used to adjust the values and weights. For example, if the user determines the responses are too short, the length criterion can be increased automatically. Similarly, if the user feedback suggests the responses are not as helpful as desired, the weight for the alignment model may be automatically increased based on the feedback to attempt to place more emphasis on responses with higher helpfulness indicated by the alignment score. In some embodiments, the values and weights may be adjusted during the decoding.

In some embodiments, rather than use the interface 300 as shown, the customer may be presented with an application programming interface as a framework parameter selection interface. The application programming interface may ask questions or may prompt for responses to queries from the user. Using the responses from the customer the reward model may be determined using, for example, an algorithm. For example, a customer may be asked a series of questions that prompts them to decide between two reward model objectives to identify one as more important. A question could ask if the resulting model should be helpful or harmless, helpful, or short, harmless or short, etc. Using the selections, a model may be created that prioritizes helpfulness over a shorter length and harmlessness. The model, when created, may have assigned weight values for each criterion that is derived from the selections, or may be polynomial weighted neural network functions.

FIG. 4A is a flow diagram depicting a response generation routine 400A for creating a response for a prompt 102 received by the response generator 122 of FIG. 1, according to one embodiment. As an example, the alignment model response system 100 of FIG. 1 can be configured to execute the response generation routine 400A. The response generation routine 400A begins at block 402.

At block 404, the alignment model response system 100 receives a user-selected alignment model and a prompt 102 for a response generator 122. In some embodiments, the alignment model is received by a reward model 112 as part of a framework parameter 110 that is usable by the response generator 122 in evaluating the potential responses. In some embodiments, the alignment model is received by a reward model 112 that is directly in communication and usable by the response generator 122. The user selected alignment model can be selected by a user via a reward model selection interface 306 as shown in FIG. 3. The alignment model can be automatically selected, or otherwise provide by other sources. In some embodiments, the alignment model is selected from a group of pre-trained alignment models, each of which can be accessibly by the response generator 122 or the reward model 112 of the framework parameters 110.

In some embodiments, the alignment model is not received before or with each new prompt, rather an alignment model can be selected and used for multiple prompts. For example, if a helpful alignment model is selected as being the best alignment model to achieve the goals of the system, the response generator 122 may continue to utilize the helpful alignment model until another model is selected by a user or is otherwise indicated to be used. In some embodiments, the selection of a new alignment model by the user may immediately provide the alignment model to the system. In some embodiments, a change in alignment model may set a flag that is reviewed by the response generator 122 each time a new prompt 102 is received. If the flag has been set, the response generator 122 may realize a need to replace the existing alignment model with the new alignment model. In some embodiments, the alignment model is only accessed by the response generator 122 as part of the response generation process and the alignment model selection is reviewed when the reward model is invoked. Upon, review the alignment model indicated by the selection can be used as part of the reward model evaluation.

The prompt 102 can be received by the response generator 122, for example at a large language model 104. The prompt 102 can be a text prompt that is provided as a natural language command. The large language model 104 can be configured to understand and interpret the prompt 102 into instructions usable by the large language model 104.

At block 406, the large language model 104 of the response generator 122 can generate and populate one or more output tokens 106 based on the prompt 102. In some embodiments, the one or more tokens can be generated based on the one or more framework parameters 110 that provide the large language model 104 and the response generator 122 with instructions on the number of output tokens 106 to generate. The output tokens 106 can be words or phrases determined by the large language model 104 to be the beginning of a natural language response to the prompt 102. For example, if the prompt 102 is, "What are the odds the Los Angeles Dodgers win the World Series next year?" The response output to the user may be, "The odds the Los Angeles Dodgers win the World Series next year are +700." The output tokens 106 may be the first tokens of the response. The number of output tokens 106 can be defined by a framework parameter 110 as a lookahead after 128 value or may be set for the large language model 104. For example, if the lookahead after 128 value is three as shown in FIG. 3, the output tokens 106 for the above response would be, "The" "odds" "the".

A large language model 104 has a near infinite number of potential responses that can be generated. To evaluate and select only one, the large language model 104 may be directed to, or may automatically, limit the number of potential responses, such as by identifying framework parameters 110 at block 408. In some embodiments, the large language model 104 will provide the potential responses or tokens the large language model 104 has determined to be the best. The number of potential responses can be determined by the framework parameters, for example, the beam size 124 parameter. However, beam size can be limited to two beams to allow the response generator 122 more than one option of response. Each beam represents a potential output response. Further, the number of tokens to be populated within each beam can be determined by the framework parameters, for example, as a lookahead length value.

At block 410, a first beam and a second beam can be generated based on the beam size of two being established by the framework parameters 110. The beams 108, after being generated, can be populated with additional tokens by the large language model 104 based on the framework parameters 110. In some embodiments, the response generator 122 can include a second large language model. The first large language model may be used to populate the output tokens at step 406 and the second large language model may be used to create the first beam and the second beam. The framework parameters may be accessible by any large language models of the response generator 122. In some embodiments, the second large language model may be a smaller large language model than the first large language model such that it requires less computing resources. The smaller model can be trained to mimic the first large language model so as to be faithful to the first large language model when generating the additional tokens. Framework parameters may describe how many tokens to populate within each beam 108. By limiting the number of populated tokens, a beam 108 may contain only partial response and may require additional tokens to be generated to create an entire response. For example, if the framework parameter 110 has a lookahead length of six, the above response according to the output tokens and the additional tokens would be, "The odds the Los Angeles Dodgers win the World." Additional tokens can be generated after a beam has been evaluated at block 412.

At block 412, the alignment model can be used to evaluate the first beam and the second beam and the tokens within. The alignment model can be trained to evaluate the potential responses of the beam as described above to determine how well the potential response aligns with the constitutional principle defined in the alignment model. In some embodiments, the alignment model can be trained on the same or a similar set of constraints as the constraints used to train the large language model 104. In some embodiments, the alignment model can be trained using at least some alternative constraints. After evaluating the first beam and the second beam, the alignment model response system 100 can calculate a preference score for the first and second beam at block 414. In some embodiments, the alignment model response system 100 can calculate the preferences scores at the response generator 122, the review model 112 or another component of the alignment model response system 100. In some embodiments, prior to populating the first beam and the second beam with tokens, the response generator 122 may review or request review of the prompt. For example, the response generator 122 could ask follow-up questions to the customer providing the prompt. For example, the prompt may be expanded and be provided to a second large language mode, as described above, with the output tokens to generate a more comprehensive response.

To evaluate the potential responses 108A-C, the alignment model response system 100 may review the responses and assign one or more features scores based on features of the responses. The features scores can be generated based on learning and feedback done when training the model. The feature scores can be combined into an aggregated feature score which is an alignment score. The alignment score can represent the percentage certainty the alignment model believes the response aligns with the alignment principle. For example, if an alignment model is a helpful model and an alignment score of the first beam 108A is calculated to be 0.7, the alignment model believes the first response 108A to be 70% aligned with the helpfulness model. Similarly, if the second beam 108B is 0.8 and the third beam 108C is 0.69, the percentages are 80% and 69% respectively. In some embodiments, if the reward model 112 is an alignment model or only includes an alignment model, the alignment score is a preference score for the reward model 112. In some embodiments, the evaluation can be done iteratively such that an evaluation is done after a new additional token is populated. The evaluation after each token may do an additional check to determine if the response is complete or if one or more additional tokens are still required.

At block 416, the alignment model response system 100 can perform a score evaluation sub-routine 400B as described below in FIG. 4B. After performing the score evaluation sub-routine 400B and selecting a beam, a response is created based on the selected beam at block 418. The response is output to the user at block 420. The alignment model response system 100 ends at block 422.

FIG. 4B is a flow diagram depicting a score evaluation sub-routine 400B of the routine in FIG. 4A for selecting a beam created by the response generator 122, according to one embodiment. The score evaluation sub-routine 400B begins at block 424. At block 426, the alignment model response system 100 determines if a first preference score for a first beam satisfies a threshold. A minimum threshold value can be an alignment score or preference score value, calculated as described above, that indicates an acceptable level of adherence or deviation from the model. In some embodiments, if the answer does not meet a minimum threshold of aggregated feature score of harmlessness, the answer can be eliminated as an option for response. If the first preference score does not satisfy a minimum threshold value, the routine continues at block 428, where the alignment model response system 100 determines if the second preference score satisfies a minimum threshold value. If the second preference score associated with a second beam satisfies the minimum threshold value, the second preference score indicates the potential response of the second beam sufficiently aligns with the constitutional principle of the alignment model and the second beam is selected at block 430. For example, the first preference score can be 0.84 and the second preference score can be 0.96. A minimum threshold value of 0.85 would result in the first preference score not satisfying the minimum threshold and could be eliminated from consideration. If the second preference score does not meet the minimum threshold value at block 432, neither beam may be selected, and the large language model may instead be prompted to generate entirely new beams with different subsets of additional tokens.

The minimum threshold value can be user-defined, auto-learned, preset, or a combination of the above.

Upon determination that the first preference score satisfies a minimum threshold value, at block 426, the sub-routine 400B continues at block 434 in which the system determines if the second preference score satisfies a threshold. Upon determination the second preference score does not satisfy the minimum threshold, the second preference score may be eliminated or erased, and the first preference score associated with the first beam can be selected at block 436. For example, the first preference score can be 0.96 and the second preference score can be 0.84. A minimum threshold value of 0.85 would result in the second preference score not satisfying the minimum threshold and could be eliminated from consideration resulting in the selection of the remaining beam which satisfies the minimum threshold.

Should both preference scores be determined to satisfy the minimum threshold at blocks 426 and 434, the sub-routine 400B may compare the first preference score and the second preference score at block 438. A first beam or a second beam can be selected based on the comparison at block 440. For example, the first preference score can be 0.84 and the second preference score can be 0.96. A minimum threshold value of 0.83 would result in the first preference score and the second preference score satisfying the minimum threshold. The comparison would determine the second preference score is higher than the first preference score indicating the second preference score has a higher adherence to the constitutional principle of the alignment model. The second beam associated with the second preference model could be selected as being a better response output. The sub-routine 400B ends at block 442.

FIG. 5 is a flow diagram depicting a weight constraint routine 500 for utilizing weights 118 and 120 and multiple constraints to generate a controlled response to a prompt 102 according to the response generator of FIG. 2, according to one embodiment. The reward model 112 can include one or more criteria to evaluate potential responses generated by the response generator 122. The routine begins at block 502.

A block 504, the response generator 122 using the large language model 104 can populate one or more tokens into one or more beams. The tokens can include output tokens 106 that are common to all beams, or all tokens can be within beams wherein the beams contain different subsets of tokens. In some embodiments, the subsets of tokens are distinct, or are a percentage distinct. For example, a first response may by "The Los Angeles Dodgers are the third most likely team to win the 2024 World Series." A second response may be, "The odds the Los Angeles Dodgers win the World Series next year are +700." Out of the 16 words in the first response, 8 words are shared with the second response. If a subset is required to be distinct, no words could be shared between the responses. If a percentage distinct is applied and determined to require 60% distinctness, at least two words in one of the responses that are shared would need to be changed to raise the distinctness from being 8/16, or 50%, to 60%.

After tokens are populated, the alignment model response system 100 can, at block 504, identify one or more framework parameters 110 for evaluating one or more beams. The framework parameter 110 for evaluating the beams can be, in some embodiments, a reward model 112. The reward model may comprise a first criterion associated with a first weight and a second criterion associated with the second weight. The reward model may include additional criterion and weights as selected by a user or required to accomplish the goals of the alignment model response system 100. In some embodiments, the first criterion can be an alignment model trained to evaluate potential responses according to a constitutional principle. The second criterion can be a constraint such as a hard constraint or a soft constraint as defined above or can be a constraint checker. The constraint checker can include one or more constraints all weighted by a common weight. Constraints within the constraint checker can further be associated with individual weights that are applied prior to the constraint checker weight being applied to the sum of the weighted constraint values of the constraints within the constraint checker. In some embodiments, the reward model 112 may be externally stored on a user's device such that the user has complete control over the reward model 112. Further, the reward model 112 stored on the user's device may be a black box that cannot be seen by the response generator 122 but can communicate with the response generator 122 for transmitting and receiving data. For example, the response generator 122 or the framework parameters 110 may only be able to provide the relevant information to the reward model 112 which will then calculate a preference score privately and return the calculated preference score for use in the response generator 122.

At block 508, the first criterion and the second criterion of the reward model 112 can be used to evaluate the one or more beams or the one or more tokens within the one or more beams. Evaluating the one or more beams can result in the alignment model of the first criterion determining an alignment score and the constraint and/or constraint checker of the second criterion determine a constraint score for each of the beams. Criterion scores can indicate a probability that a response created using each of the one or more beams will comply with the criterion. The alignment model scores may indicate the probability the beam aligns with the constitutional principle using aggregated feature scores as described above or other methods of determining an alignment model score. For example, an alignment model score for a response may be 0.8, a second response may be 0.65, and a third response may be 0.7. These scores indicate the alignment model is 80% confident the first response is harmless, 65% confident the second response is harmless, and 70% confident the third response is harmless. The constraint score may be a binary answer such that a constraint score associated with the constraint checker is 0 or 1. For example, if the constraint sets a maximum length for an answer to be less than 10 words and the first response is 11 words, the constraint score for the first response is 0. If the third response is 9 words, the constraint score for the third response is 1.

At block 510, the alignment model response system 100 can calculate a first criterion score for each of the one or more beams by weighing the alignment model with a defined weight value. For example, the alignment model may be weighted with a weight of 1.2 giving the first response a criterion score of 0.96 and the third response a criterion score of 0.84.

At block 512, the alignment model response system 100 can calculate a second criterion by multiplying the constraint score by the weight assigned to the constraint to determine the second criterion score for the response. For example, if the weight for the length of the response is 0.3, the second criterion score for the first response is 0 and the second criterion for the third response is 0.3. In some embodiments, when length is determined, the alignment model response system 100 can predict if the response created by the potential response will satisfy the length even if not all tokens have been populated.

At block 514, the first criterion score and the second criterion score can be combined, for instance via summation or other function, to determine a combined preference score for each of the one or more beams at block 516. In some embodiments, a preference score can be provided as an input from a customer. In some embodiments, a customer may review and adjust preference scores prior to preference score use. Based on the combined preference scores, a reward parameter beam may be selected from the one or more beams at block 518. For example, the weights may be adjusted so the highest combined preference score indicates the best beam to achieve the goals of the alignment model response system 100. In some embodiments, the preference scores may be combined and weighted using an additive weight function. For example, the weights could be added to a sine or a cosine based function. In some embodiments, the weights can be used as exponents. Based on the response parameter beam, the response can be created at block 520. In some embodiments, the response parameter beam may be a partial response and more tokens can be generated by the large language model 104 and be used to create a complete response. After the response is created, at block 522 the response can be transmitted or output. The routine 500 ends at block 524.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any classification type of non-transitory computer-readable medium or other computer storage device. Some or all the methods may be embodied in specialized computer hardware.

Execution Environment

Figure 6:
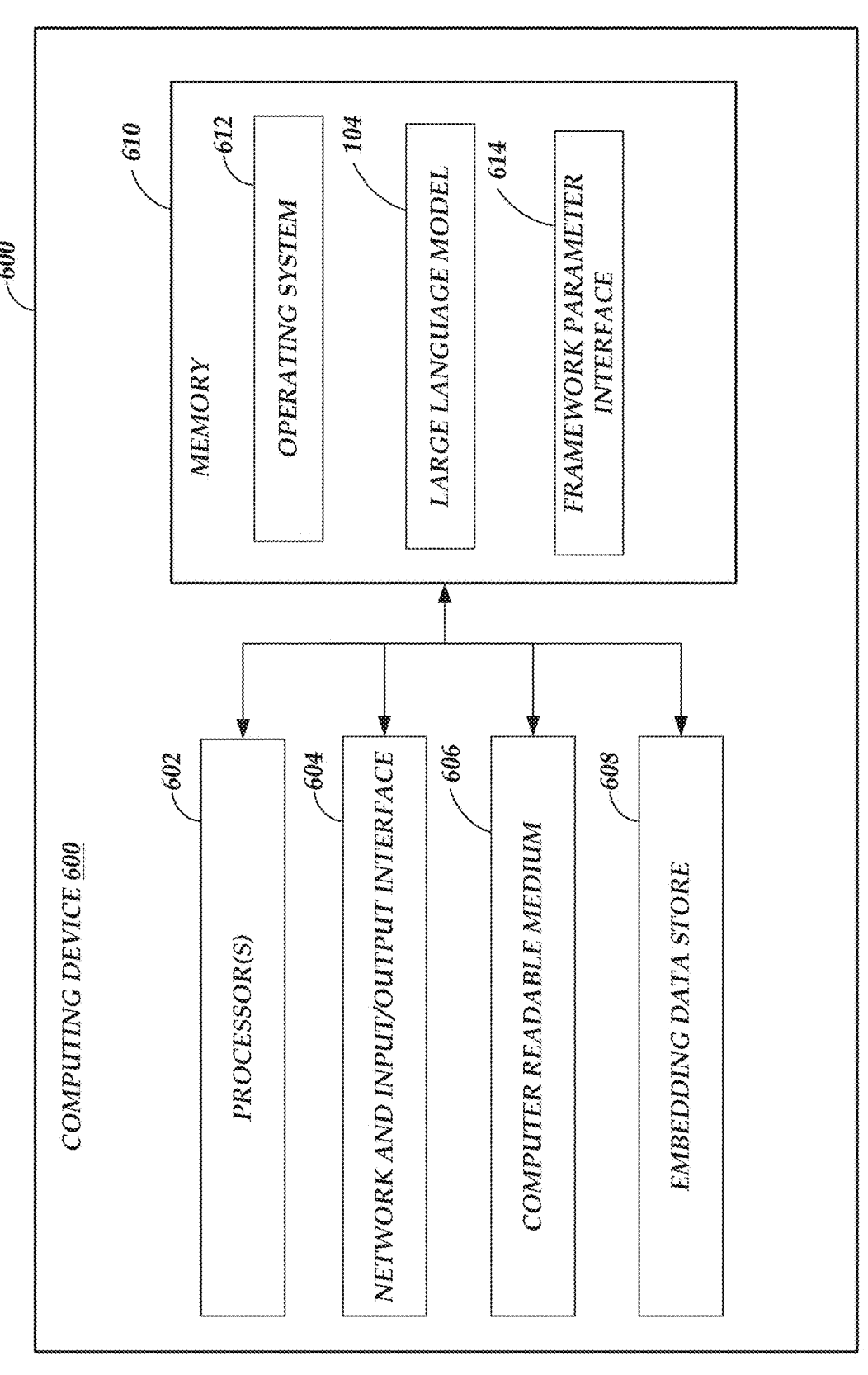
FIG. 6 depicts a general architecture of response generator that utilizes one or more large language models in conjunction with framework parameters to generate responses in accordance with some embodiments of the present disclosure.

FIG. 6 depicts an example architecture of a computing device (e.g., the response generator 122) that can be used to perform one or more of the techniques described herein or illustrated in FIGS. 1-5. The general architecture of the response generator 122 depicted in FIG. 6 includes an arrangement of computer hardware and software modules that may be used to implement one or more aspects of the present disclosure. The response generator 122 may include many more (or fewer) elements than those shown in FIG. 6. It is not necessary, however, that all of these elements be shown in order to provide an enabling disclosure.

In some embodiments, the computing device 600 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the computing device 600 may be implemented as web services consumable via one or more communication networks. In further embodiments, the computing device 600 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a computing device 600 may include: one or more computer processors 602, such as physical central processing units ("CPUs"); one or more network and input/output interfaces 604, such as a network interface cards ("NICs"); one or more computer-readable media 606, such as a high density disk ("HDDs"), solid state drives ("SSDs"), flash drives, and/or other persistent non-transitory computer readable media; and one or more embedding data stores 608; a memory 610 that includes operating system 612, large language model 104, and a framework parameter interface 614

The processor 602 may communicate with memory 610. The memory 610 may contain computer program instructions (grouped as modules or units in some embodiments) that the processor 602 executes in order to implement one or more aspects of the present disclosure. The memory 610 may include random access memory (RAM), read only memory (ROM), and/or other persistent, auxiliary, or non-transitory computer-readable media. Additionally, the memory 610 can be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). The memory 610 may store an operating system (not shown in FIG. 6)

that provides computer program instructions for use by the processor 602 in the general administration and operation of the search system 106.

Additionally, the memory 610 may further include computer program instructions and other information for implementing one or more aspects of the present disclosure, including but not limited to the large language model 104 and the framework parameter interface 614. The processor 602 may execute the instructions or program code stored in the memory 610 to access the framework parameters 110 to generate a response to a prompt 102. In some embodiments, the framework parameters 110 and reward model 112 are stored on the memory of computing device 600. In some embodiments, parts or all of the large language model 104, framework parameter interface 614, framework parameters 110 and reward model 112 may be implemented by hardware circuitry, firmware, software or a combination thereof.

The network and input/output interface 604 may commonly support one or more wireless networking protocols (e.g., Wi-Fi/IEEE 802.11, or another wireless networking standard). However, in various embodiments, network and input/output interface 604 may support communication via any suitable wired or wireless general data networks, such as other types of Ethernet networks, for example. Additionally, network and input/output interface 604 may support communication via telecommunications/telephony networks such as analog voice networks or digital fiber communications networks, via storage area networks such as Fibre Channel SANs, or via any other suitable type of network and/or protocol.

The computer-readable medium 606 may include computer program instructions that one or more processors 602 execute and/or data that the one or more processors 602 use in order to implement one or more embodiments.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any classification type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might." "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements, or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method comprising:

as implemented by a hardware processor configured to execute computer-executable instructions:

populating one or more tokens for a prompt using a large language model, wherein the one or more tokens are populated in one or more beams;

identifying one or more framework parameters for evaluating the one or more beams, wherein the one or more framework parameters comprise:

a first criterion associated with a first weight and an alignment score, wherein the alignment score is calculated using an alignment model trained using a set of constraints, and wherein the alignment score comprises a preference score of aggregated feature scores; and a constraint checker comprising a second criterion associated with a second weight, wherein the second criterion is a first constraint and is associated with a constraint score, and wherein the constraint score is a binary score based on adherence to a rule;

evaluating the one or more beams based on the second criterion to identify a subset of beams of the one or more beams, wherein the subset of beams comprises each beam of the one or more beams that satisfies the second criterion;

evaluating each beam of the subset of beams based on the first criterion;

calculating a first criterion score for each beam of the subset of beams using the alignment score of the first criterion adjusted by the first weight;

calculating a second criterion score for each beam of the subset of beams using the constraint score of the second criterion adjusted by the second weight;

determining a combined preference score for each beam of the subset of beams using the first criterion score and the second criterion score;

selecting, based on the combined preference score for each beam of the subset of beams, a reward parameter beam;

creating a response to the prompt based on the reward parameter beam; and outputting the response.

2. The method of claim 1, wherein the aggregated feature scores comprise one or more feature scores, wherein each feature score of the one or more feature scores is a comparison of an expected feature that is expected by the alignment model to a feature within a beam.

3. The method of claim 1, wherein the constraint checker further includes a second constraint.

4. The method of claim 1, wherein the first constraint is one of a keyword, a maximum length, a minimum length, a format, or an inclusion requirement.

5. The method of claim 1, wherein the alignment model is one or more of a helpful alignment model, a harmless alignment model, or an honest alignment model.

6. The method of claim 1, wherein the one or more beams created are created based on the one or more framework parameters.

7. The method of claim 6, wherein the one or more framework parameters comprise at least one of a a beam size, a lookahead length, a lookahead after, or a reward parameter.

8. A non-transitory computer-readable medium storing instructions that, when executed by a computing system within a cloud provider network, cause the computing system to perform operations comprising:

populating one or more tokens for a prompt using a large language model, wherein the one or more tokens are populated in one or more beams;

identifying one or more framework parameters for evaluating the one or more beams, the one or more framework parameters comprising:

a reward parameter having a first criterion associated with an alignment score derived from an alignment model trained using a set of constraints; and a constraint checker comprising a second criterion as a constraint, wherein the second criterion is associated with a constraint score;

evaluating the one or more beams based on the second criterion to identify a subset of beams of the one or more beams, wherein the subset of beams comprises each beam of the one or more beams that satisfies the second criterion;

evaluating each beam of the subset of beams based on the first criterion;

calculating a first criterion score for each beam of the subset of beams, wherein calculating the first criterion score comprises adjusting by a first weight;

calculating a second criterion score for each beam of the subset of beams, wherein calculating the second criterion score comprising adjusting by a second weight;

selecting, based on a combined preference score for each beam of the subset of beams, a reward parameter beam; and transmitting the reward parameter beam.

9. The non-transitory computer-readable medium of claim 8, wherein the reward parameter includes the first weight and the second weight.

10. The non-transitory computer-readable medium of claim 9, wherein the first weight and the second weight are user-defined, via an interface.

11. The non-transitory computer-readable medium of claim 8, wherein the alignment score is a preference score of aggregated feature scores, wherein each feature score of the aggregated feature scores is a comparison of an expected feature expected by the alignment model to a feature within a beam.

12. The non-transitory computer-readable medium of claim 8, wherein the constraint checker further includes a third criterion as a second constraint associated with a third weight.

13. The non-transitory computer-readable medium of claim 8, wherein the constraint is one of a keyword, a maximum length, a minimum length, a format, or an inclusion requirement.

14. The non-transitory computer-readable medium of claim 8, wherein the alignment model is one of a helpful alignment model, a harmless alignment model, or an honest alignment model.

15. A system comprising:
   a data storage medium to store computer-executable instructions; and
   a processor in communication with the data storage medium, wherein the processor executes the computer-executable instructions to at least:
      populate one or more tokens for a prompt using a large language model, wherein the one or more tokens are populated in one or more beams;

identify one or more framework parameters for evaluating the one or more beams comprising a first criterion and a second criterion;
      evaluate the one or more beams based on the first criterion and the second criterion, wherein the first criterion is associated with a first score and the second criterion is associated with a second score;
      calculate a first criterion score for each of the one or more beams using the first score of the first criterion adjusted by a first weight;
      calculate a second criterion score each of the one or more beams using the second score of the second criterion adjusted by a second weight; and
      select, based on a combined preference score for each of the one or more beams, a reward parameter beam, wherein the combined preference score is determined using the first criterion score and the second criterion score.

16. The system of claim 15, wherein the first criterion is an alignment model, and the second criterion is a constraint checker.

17. The system of claim 16, wherein the constraint checker includes a first constraint and a second constraint.

18. The system of claim 17, wherein each of the alignment model, the first constraint, and the second constraint is associated with a different weight.

19. The system of claim 17, wherein the first constraint and the second constraint are user-selected via a user interface.

20. The system of claim 16, wherein the alignment model is selected via user interaction with an alignment model selection interface.

* * * * *